(12) United States Patent
Okamura et al.

(10) Patent No.: US 10,998,763 B2
(45) Date of Patent: May 4, 2021

(54) POWER SUPPLY WITH PROGRAMMABLE RESTRICTION

(71) Applicant: Juniper Networks, Inc., Sunnyvale, CA (US)

(72) Inventors: Katsuhiro Okamura, Watsonville, CA (US); Jaspal S. Gill, Tracy, CA (US); Muhammad Sagarwala, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 18 days.

(21) Appl. No.: 16/414,334

(22) Filed: May 16, 2019

(65) Prior Publication Data

US 2019/0273394 A1 Sep. 5, 2019

Related U.S. Application Data

(63) Continuation of application No. 15/476,021, filed on Mar. 31, 2017, now Pat. No. 10,298,055.

(51) Int. Cl.
*H02J 13/00* (2006.01)
*H02J 4/00* (2006.01)
*G05B 15/02* (2006.01)
*H02J 3/14* (2006.01)

(52) U.S. Cl.
CPC ............. *H02J 13/00* (2013.01); *G05B 15/02* (2013.01); *H02J 3/14* (2013.01); *H02J 4/00* (2013.01); *H02J 13/0006* (2013.01); *H02J 13/00019* (2020.01); *H02J 13/0062* (2013.01); *H02J 13/0075* (2013.01); *H02J 13/0079* (2013.01)

(58) Field of Classification Search
CPC .... H02J 13/00; H02J 13/0003; H02J 13/0006; H02J 13/0075; H02J 13/0079; H02J 13/0019; H02J 13/0013; H02J 13/0086; H02J 4/00; G05B 15/02
See application file for complete search history.

(56) References Cited

U.S. PATENT DOCUMENTS

| 10,298,055 B1 | 5/2019 | Okamura et al. |
| 2009/0189548 A1* | 7/2009 | Hoffman ................ H05B 45/00 315/307 |
| 2016/0338165 A1 | 11/2016 | Zhai et al. |

* cited by examiner

*Primary Examiner* — Jue Zhang
(74) *Attorney, Agent, or Firm* — Harrity & Harrity, LLP

(57) ABSTRACT

A device may include a power supply module (PSM). The PSM may receive information regarding one or more programmable restrictions associated with a power supply. The PSM may receive a measurement of voltage associated with the power supply. The PSM may determine a current associated with the power supply based on the one or more programmable restrictions, the measurement of voltage, and a first amount of power associated with the power supply. The PSM may cause a load associated with the power supply to be adjusted based on determining the current without removing power for a connection between the power supply and a power source associated with the power supply. The PSM may cause the power supply to provide a second amount of power based on causing the load associated with the power supply to be adjusted.

20 Claims, 6 Drawing Sheets

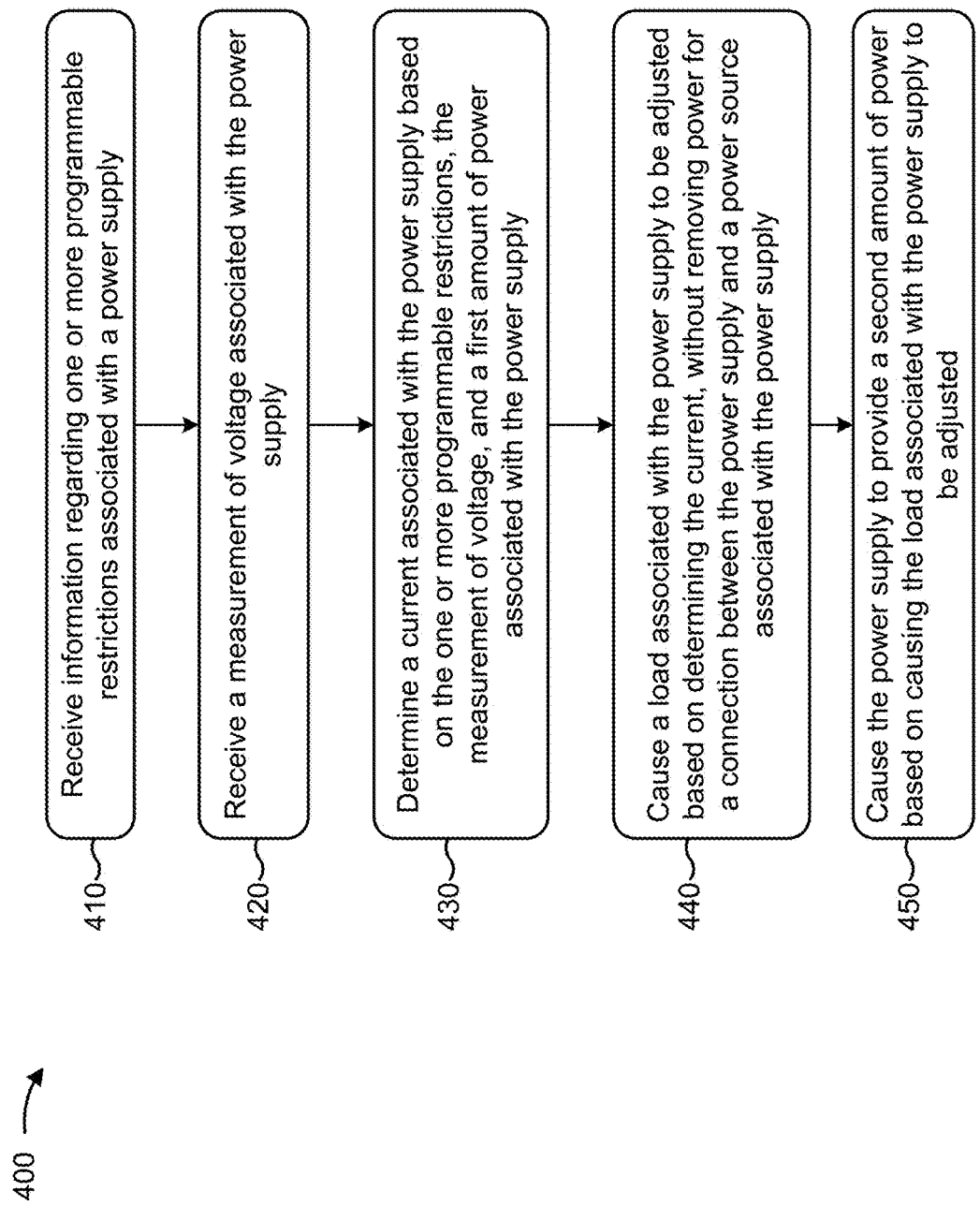

POWER SUPPLY WITH PROGRAMMABLE RESTRICTION

RELATED APPLICATION

This application is a continuation of U.S. patent application Ser. No. 15/476,021, filed Mar. 31, 2017 (now U.S. Pat. No. 10,298,055), the disclosure of which is incorporated herein by reference.

BACKGROUND

A power supply is an electronic device that supplies electrical energy (e.g., power) to a load. The power supply may be associated with a power supply module (PSM). A purpose of the PSM may be to adjust the amount of power that the power supply provides. The PSM may be a discrete device or may be built into another device (e.g., a power supply), such as a PSM included in a desktop computer, a consumer electronics device, a network device, and/or the like.

SUMMARY

According to some possible implementations, a device may include a power supply module (PSM). The PSM may receive information regarding one or more programmable restrictions associated with a power supply. The PSM may receive a measurement of voltage associated with the power supply. The PSM may determine a current associated with the power supply based on the one or more programmable restrictions, the measurement of voltage, and a first amount of power associated with the power supply. The PSM may cause a load associated with the power supply to be adjusted based on determining the current without removing power for a connection between the power supply and a power source associated with the power supply. The PSM may cause the power supply to provide a second amount of power based on causing the load associated with the power supply to be adjusted.

According to some possible implementations, a device may include a PSM. The PSM may receive information regarding one or more programmable restrictions associated with a power supply. The PSM may receive a measurement of voltage associated with the power supply. The PSM may determine a current associated with the power supply based on the one or more programmable restrictions and the measurement of voltage. The PSM may cause a load associated with the power supply to be adjusted, based on determining the current, without removing power for a connection between the power supply and a power source associated with the power supply. The PSM may determine an amount of power based on causing the load associated with the power supply to be adjusted. The amount of power may be determined based on the current and the measurement of voltage. The PSM may cause the power supply to provide the amount of power based on determining the amount of power.

According to some possible implementations, a method may include receiving, by a PSM associated with a power supply, information regarding one or more programmable restrictions associated with the power supply. The method may include receiving, by the PSM, a measurement of voltage associated with the power supply. The method may include determining, by the PSM, a current associated with the power supply based on the one or more programmable restrictions, the measurement of voltage, and a first amount of power associated with the power supply. The method may include adjusting, by the PSM, the power supply based on determining the current. The method may include preventing, by the PSM, the power supply from satisfying the one or more programmable restrictions associated with the power supply without removing power for a connection between the power supply and a power source associated with the power supply. The method may include causing, by the PSM, the power supply to provide a second amount of power based on adjusting the power supply.

BRIEF DESCRIPTION OF THE DRAWINGS

FIG. 4 is a flow chart of an example process for providing power based on one or more programmable restrictions associated with a power supply.

DETAILED DESCRIPTION

Figure 1A:
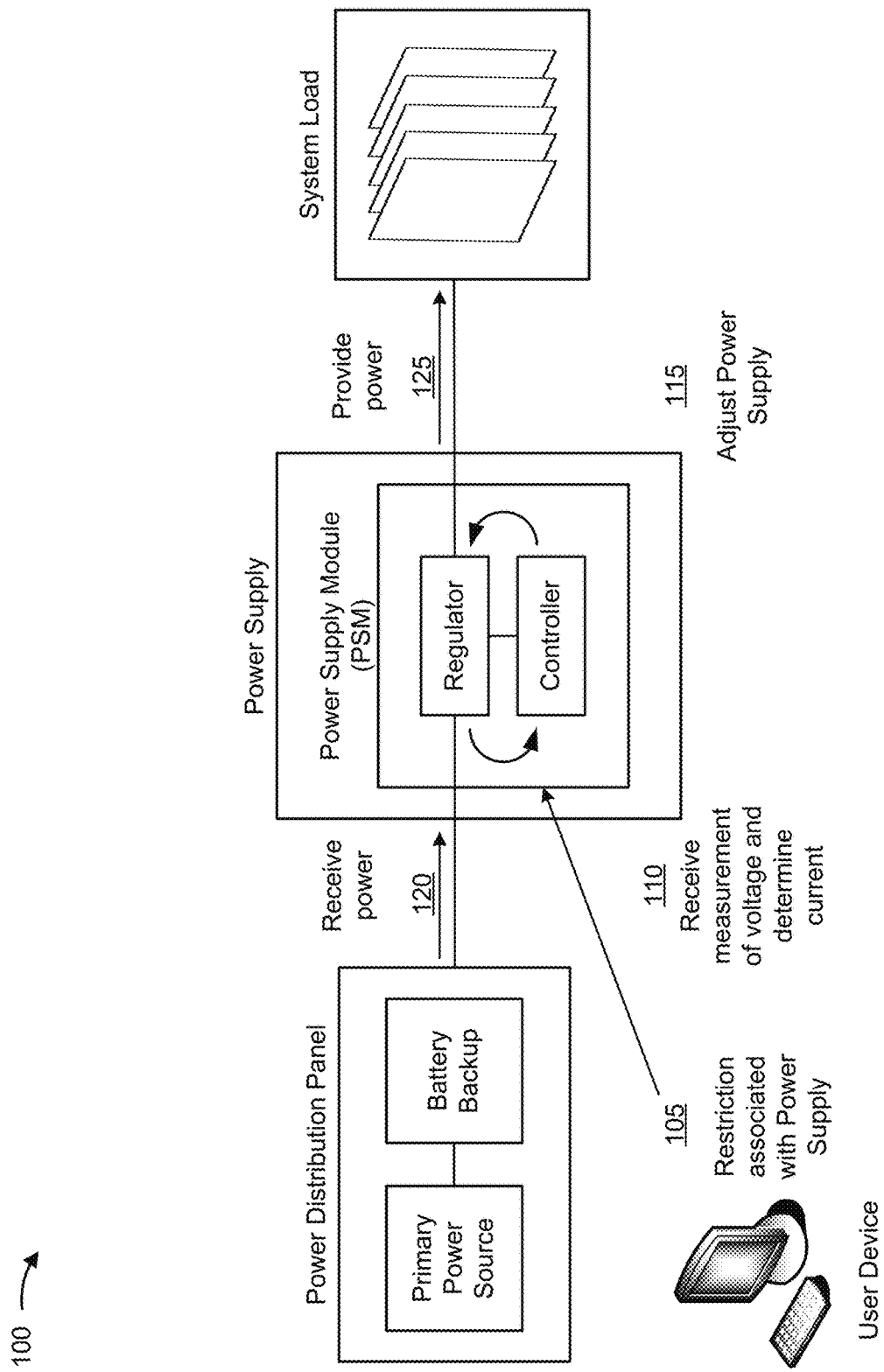
FIGS. 1A-1C are diagrams of an overview of an example implementation described herein.

The following detailed description of example implementations refers to the accompanying drawings. The same reference numbers in different drawings may identify the same or similar elements.

A user may be associated with a power source that provides power to a power supply. The power supply may be chosen by the user to provide electrical energy (e.g., power) to an electronic device or a plurality of electronic devices. The electronic device may consume the electrical energy that the power supply provides. In some implementations, the power supply may be chosen based on a maximum amount of power that is provided to the electronic device and that the electronic device consumes. For example, if the maximum amount of power that the electronic device consumes in a worst case scenario is 3000 W, then the power supply that is chosen may be one that is rated to provide a maximum amount of power of at least 3000 W. An electronic device that consumes the power that the power supply provides may be referred to as a load.

The user may also choose a power source that provides power to the load via the power supply based on the power supply and/or the load. In the example above, a power source may be chosen that is rated to provide at least 3000 W. The power source may be rated to provide a maximum amount of power based on a maximum current and/or a maximum voltage that the power source may provide. In some implementations, the load may consume an average amount of power that is less than the maximum amount of power that the power source is rated to provide. However, the user may have incurred an expenditure related to a more expensive power source that is rated to provide power based on the maximum amount of power consumed by the load in the worst case scenario as compared to a less expensive power source that is rated to provide less power than the maximum amount of power consumed by the load (e.g., the average amount of power consumed by the load).

In some implementations, the user may choose a power source that is rated to provide an amount of power that is less than the maximum amount of power that the load may consume in the worst case scenario. However, the power source may not be able to provide power to the load (via the power supply) in some situations. For example, the power source may remove power for (e.g., disconnect, disengage, deactivate, power off, not receive power, not provide power, etc.) a connection with the power supply when the amount of power that the load consumes changes.

The power source may remove power for the connection to prevent the load from consuming more power than the maximum amount of power that the power source is rated to provide. In such a case, the power source may attempt to provide more current than the maximum current that the power source is rated to provide. The power source may remove power for the connection with the power supply based on a protective device (e.g., an electrical switch, a relay, a circuit breaker, a fuse, etc.) associated with the power source and/or the power supply.

Implementations described herein provide a power supply module (PSM) that may determine a current associated with the power supply based on one or more programmable restrictions, a measurement of voltage, and an amount of power associated with the power supply. The PSM may cause a load associated with the power supply to be adjusted based on determining the current without removing power for a connection between the power supply and a power source associated with the power supply. For example, the PSM may cause at least a portion of the load associated with the power supply to decrease an amount of power the load may consume and/or cause power to be removed for at least a portion of the load when the current that the power supply may provide to the load satisfies the one or more programmable restrictions associated with the power supply. The PSM may cause the power supply to provide an amount of power to the load based on a value of current that satisfies the one or more programmable restrictions associated with the power supply.

In this way, the PSM may allow a user to avoid incurring an expenditure associated with a more expensive power source that provides power to the power supply based on a maximum amount of power consumed by the load as compared to a less expensive power source that provides less power to the power supply than the maximum amount of power consumed by the load (e.g., the average amount of power consumed by the load). The PSM may also prevent the power source and/or the power supply from being damaged based on a change in the amount of power that the load may consume. Further, by not removing power for the connection between the power supply and the power source, the PSM may allow the power supply and/or the power source to provide power to the load when the amount of power that the load may consume changes.

In addition, the PSM may allow at least a portion of the load associated with the power supply to remain in power (e.g., connected, engaged, activated, powered on, receive power, provide power, etc.) when at least a portion of the power source is removed from power (e.g., disconnected, disengaged, deactivated, powered off, does not receive power, does not provide power, etc.). The PSM may also prevent the power source and/or the power supply from being damaged when the power that the power supply provides is adjusted. The power that the power supply provides may be adjusted based on at least the portion of the power source being removed from power.

Figure 1B:
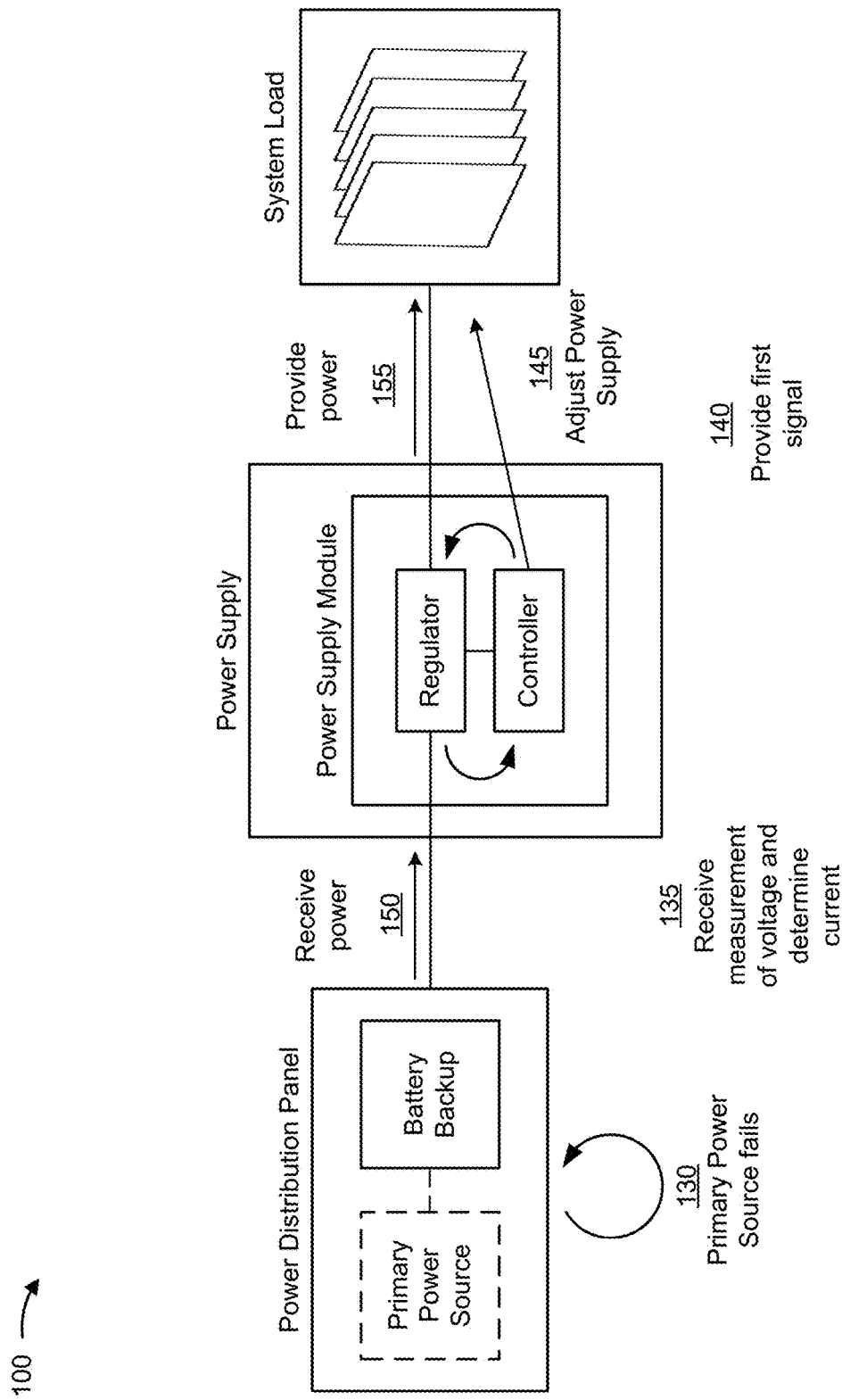
Figure 1C:
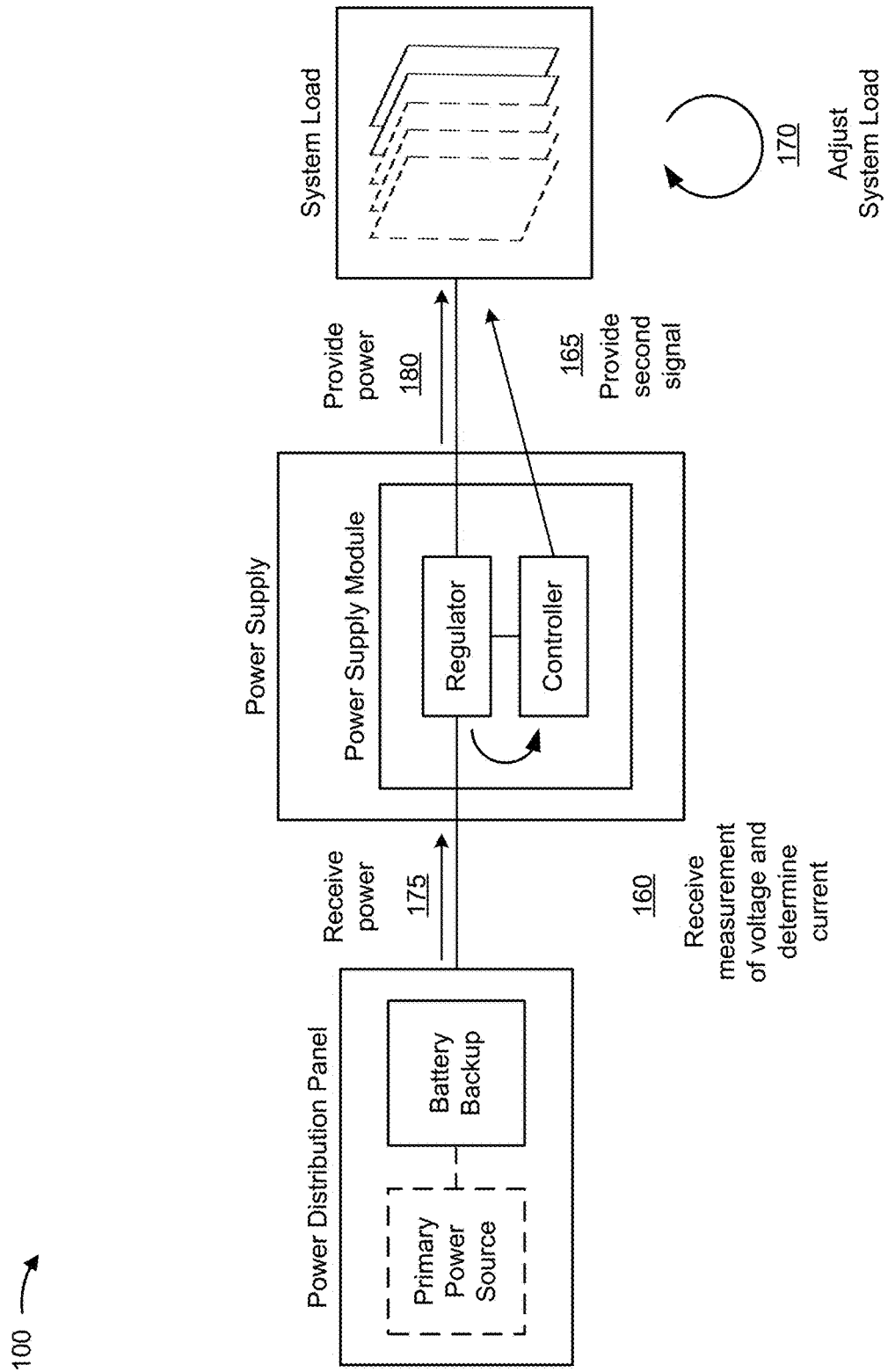

FIGS. 1A-1C are diagrams of an overview of an example implementation 100 described herein. As shown in FIG. 1A, example implementation 100 may include a power source (e.g., a power distribution panel), a power supply, a system load, and a user device. In some implementations, the power supply may include a power supply module (PSM) and the PSM may include a regulator and a controller. In some implementations, the power distribution panel may include a primary power source and a battery backup.

As further shown in FIG. 1A, assume that the power supply is operating under a normal condition. In such a case, the power supply may receive power from the primary power source of the power distribution panel. The primary power source may be connected at an input of the power supply and the power supply may provide power to the system load connected at an output of the power supply based on the primary power source. In some implementations, the battery backup may be charged by the primary power source. In some implementations, the power supply may receive power from the primary power source and/or the battery backup of the power distribution panel.

As shown by reference number 105, the PSM may receive information regarding one or more programmable restrictions associated with the power supply (e.g., a maximum threshold value of current that the power supply may receive and/or may provide, a maximum threshold value of power that the power supply may receive and/or may provide, etc.) from the user device. In some implementations, the one or more programmable restrictions may be based on an electrical parameter associated with the amount of power that the power supply may receive and/or may provide, and/or that the power source (e.g., the power distribution panel, the primary power source, the battery backup, etc.) may provide. For example, the information regarding the one or more programmable restrictions may be a maximum threshold value of current that the power supply may receive from the power distribution panel (e.g., a maximum threshold value of 60 Å). In some implementations, the maximum threshold value (e.g., 60 Å) may equal the maximum current that the power distribution panel may provide.

By receiving information regarding one or more programmable restrictions associated with the power supply, the PSM may prevent damage to the PSM, the power supply, the power source, and/or the system load based on an value of an electrical parameter (e.g., power, current, voltage, etc.) that satisfies the one or more programmable restrictions.

As shown by reference number 110, the PSM may receive a measurement of voltage associated with the power supply and the PSM may determine a current associated with the power supply based on the measurement of voltage and an amount of power associated with the power supply. For example, the PSM may receive, via the controller of the PSM, a measurement of voltage of, for example, 54V at the input of the power supply and the PSM may determine, via the controller, that the power supply may receive a current of, for example, 57.8 Å from the power distribution panel based on the measurement of voltage of 54V and an amount of power of 3120 W that the power supply may provide to the system load. As shown by reference number 115, the PSM may adjust the power supply based on determining the current. For example, the PSM may increase, via the regulator of the PSM, the current that the power supply may receive from the power distribution panel from 55.7 Å to 57.8 Å.

As shown by reference number 120, the power supply may receive an amount of power from the power distribution panel based on adjusting the power supply. For example, the power supply may receive 3120 W from the power distribution panel at the input of the power supply based on the power supply receiving a current of 57.8 A and the measurement of voltage of 54V. As shown by reference number

125, the power supply may provide an amount of power to the system load. For example, the power supply may provide 3120 W to the system load.

As shown in FIGS. 1B and 1C, and in contrast to FIG. 1A, assume that the power supply is operating under an abnormal condition. In such a case, the power supply may receive power from the battery backup of the power distribution panel that is connected at the input of the power supply. The power supply may provide power to the system load that is connected at the output of the power supply based on the battery backup.

As shown in FIG. 1B and by reference number 130, assume that the primary power source of the power distribution panel experiences a malfunction (e.g., a failure, etc.). For example, a power line associated with the primary power source may have an outage and the primary power source is no longer able to provide power to the power supply. As shown by reference number 135, the PSM may receive a measurement of the voltage associated with the power supply. The PSM may determine a current associated with the power supply based on the measurement of voltage and an amount of power associated with the power supply. For example, the PSM may receive, via the controller, a measurement of voltage of 52V at the input of the power supply. The PSM may determine, via the controller, that the power supply may receive a current of 60 A (i.e., the maximum threshold value of current) from the power distribution panel based on the measurement of voltage of 52V and the amount of power of 3120 W that the power supply may provide to the system load.

As shown by reference number 140, the PSM may provide a first signal to the system load based on the one or more programmable restrictions. For example, the PSM may provide the first signal that includes information indicating that the power supply may receive the maximum threshold value of current, 60 A.

By providing the first signal to the system load, the PSM may prevent the system load from increasing an amount of power that the system load may consume. In this way, the PSM may prevent damage to the PSM, the power supply, the power source, and/or system load. In this way, the PSM may also prevent power being removed for (e.g., disconnecting, disengaging, deactivating, powering off, power not being received by, power not being provided to, etc.) the system load based on the system load increasing the amount of power that the system load consumes.

As shown by reference number 145, the PSM may adjust the power supply based on determining the current. For example, the PSM may increase, via the regulator, the current that the power supply receives from the power distribution panel from 57.8 A to 60 A.

As shown by reference number 150, the power supply may receive an amount of power from the power distribution panel based on adjusting the power supply. For example, the power supply may receive 3120 W from the power distribution panel at the input of the power supply based on the power supply receiving a current of 60 A and the measurement of voltage of 52V. As shown by reference number 155, the power supply may provide an amount of power to the system load. For example, the power supply may provide 3120 W to the system load.

As shown in FIG. 1C and by reference number 160, the PSM may receive a measurement of voltage associated with the power supply. The PSM may determine a current associated with the power supply based on the one or more programmable restrictions, the measurement of voltage, and an amount of power associated with the power system. For example, the PSM may receive, via the controller of the PSM, a measurement of voltage of 50V at the input of the power supply. The PSM may determine, via the controller, that the power supply may receive a current of 60 A from the power distribution panel based on the measurement of voltage of 50V and the amount of power, 3120 W, that the power supply previously provided to the system load.

In some implementations, the PSM may determine that the voltage at the input of the power supply has decreased to a value that may prevent the power supply from providing the amount of power that the power supply previously provided to the system load. The PSM may determine that the power supply may receive the maximum threshold value of current, 60 A, from the power distribution panel so that the power supply may provide a maximum amount of power available from the power supply to the system load. For example, the PSM may determine that the power supply may provide 3000 W to the system load based on determining that the power supply may receive a current of 60 A from the power distribution panel based on the measurement of voltage of 50V.

As shown by reference number 165, the PSM may provide a second signal to the system load to cause the system load to be adjusted based on determining the current. The PSM may provide the second signal to cause the system load to be adjusted without removing power for a connection between the power supply and the power distribution panel. In some implementations, the second signal may include information indicating a maximum amount of power available that the power supply may provide to the system load. For example, the second signal may include information indicating the maximum amount of power available is 3000 W.

By providing the second signal to the system load, the PSM may cause the system load to decrease an amount of power that the system load consumes, which may prevent damage to the PSM, the power supply, the power source, and/or the system load. In this way, the PSM may also prevent the system load from decreasing an amount of power that the system load consumes by a greater amount than necessary.

As shown by reference number 170, the system load may adjust an amount of power that the system load may consume. For example, the system load may decrease the amount of power that the system load may consume from 3120 W to 3000 W based on the second signal. The system load may adjust the amount of power based on the system load consuming more than the maximum amount of power that is available from the power supply. The system load may also adjust an amount of power so that power is not removed for (e.g., connected, engaged, activated, powered on, power being received by, power being provided to, etc.) a connection between the power supply and the power distribution panel.

By causing the system load to adjust the amount of power that the system load consumes, the PSM may prevent power from being removed for the connection between the power supply and the power distribution panel. In this way, the PSM may prevent power being removed for the system load based on preventing power from being removed for the connection.

In some implementations, if the system load were to consume more power than the maximum amount of power that is available from the power supply, the power supply may satisfy the one or more programmable restrictions associated with the power supply (e.g., the maximum threshold value of current that the power supply may receive, etc.).

Additionally, the power supply may remove power for a connection with the power distribution panel, or vice versa, to prevent damage to the power supply and/or the power distribution panel.

As shown by reference number 175, the power supply may receive an amount of power from the power distribution panel based on causing the system load to be adjusted. For example, the power supply may receive 3000 W from the power distribution panel at the input of the power supply based on the power supply receiving a current of 60 A and the measurement of voltage of 50V. As shown by reference number 180, the power supply may provide the amount of power received from the power distribution panel based on causing the system load to be adjusted. For example, the power supply may provide 3000 W to the system load.

In this way, the PSM may allow at least a portion of the load of the power supply to remain in power when at least a portion of the power distribution panel experiences a malfunction (e.g., a failure). The PSM may also prevent the power supply and/or the power distribution panel from being damaged when the maximum amount of power that the power supply provides is adjusted based on the malfunction of at least the portion of the power distribution panel. Further, the PSM may allow a user to avoid incurring an expenditure associated with a more expensive power source that provides power to the power supply based on a maximum amount of power consumed by the system load as compared to a less expensive power source that provides power to the power supply based on an amount of power that is less than the maximum amount of power consumed by the system load.

As indicated above, FIGS. 1A-1C are provided merely as an example. Other examples are possible and may differ from what was described with regard to FIGS. 1A-1C.

Figure 2:
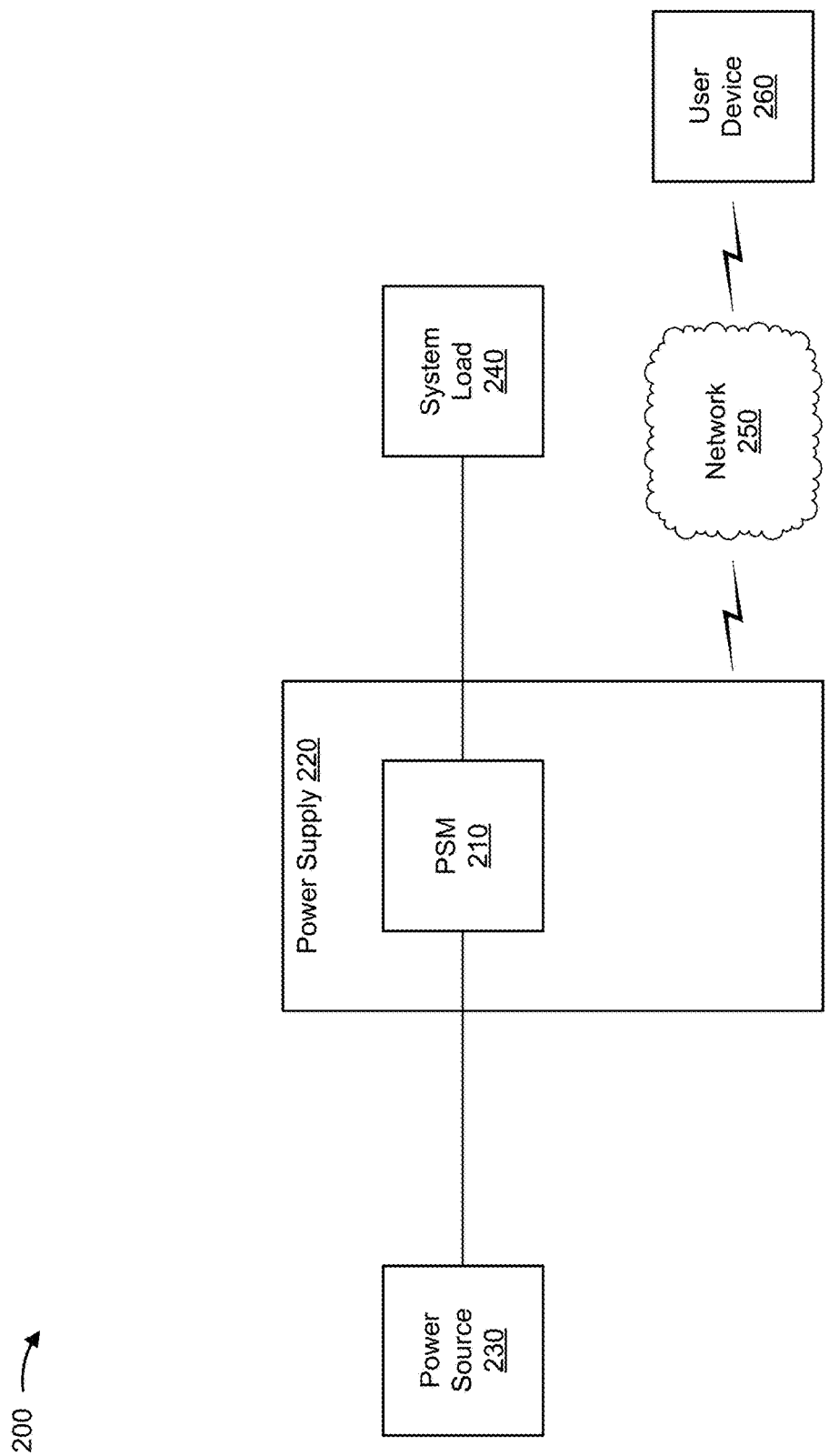
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include power supply module (PSM) 210, power supply 220, power source 230, system load 240, network 250, and user device 260. Devices of environment 200 may interconnect via wired connections, wireless connections, or a combination of wired and wireless connections.

PSM 210 may include a device capable of managing, controlling, monitoring, modifying, and/or adjusting an amount of power, current, and/or voltage associated with power supply 220. For example, PSM 210 may include an Alternating Current to Direct Current (AC/DC) power supply module, a Direct Current to Direct Current (DC/DC) power supply module, and/or the like. In some implementations, PSM 210 may receive information from and/or transmit information to another device (e.g., power supply 220, system load 240, user device 260, power source 230, etc.) in environment 200. In some implementations, PSM 210 may be a device that is separate from power supply 220.

Power supply 220 may include a device capable of receiving an electrical parameter from one or more devices (e.g., power source 230) and/or providing the electrical parameter to one or more devices (e.g., system load 240). For example, power supply 220 may include a Direct Current (DC) power supply, an AC-to-DC supply, a Linear regulator, an Alternating Current (AC) power supply, a switched-mode power supply, a programmable power supply, an uninterruptible power supply, a high voltage power supply, and/or the like. In some implementations, power supply 220 may include one or more PSMs 210. In some implementations, power supply 220 may receive information from and/or transmit information to another device in environment 200.

Power source 230 may include a device capable of providing power to power supply 220. For example, power source 230 may include a power distribution panel, an AC power source, a DC power source, an electrical grid, an electrical distribution grid, an electromechanical device, a generator, an alternator, a power converter, an energy storage device, a battery, a fuel cell, a power supply, and/or the like. In some implementations, power source 230 may include a primary power source and a battery backup, as shown in FIGS. 1A-1C.

System load 240 may include one or more devices capable of receiving power and/or consuming power from power supply 220. Examples include a data center, a server farm, a network device, a server, a computing device, a processor, a lighting system, a line card, a server card, a blade server, an electrically controlled building system (e.g., a heating, ventilation and air conditioning (HVAC) system), and/or the like.

Network 250 may include one or more wired and/or wireless networks. For example, network 250 can include a cellular network (e.g., a long-term evolution (LTE) network, a code division multiple access (CDMA) network, a 3G network, a 4G network, a 5G network, another type of next generation network (NGN), a New Radio network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

User device 260 may include one or more devices capable of receiving, generating, storing, processing, and/or providing information associated with PSM 210, power supply 220, power source 230, and/or system load 240. For example, user device 260 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), and/or the like. In some implementations, user device 260 may receive information from and/or transmit information to another device in environment 200. In some implementations, user device 260 may correspond to or be a component of system load 240.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
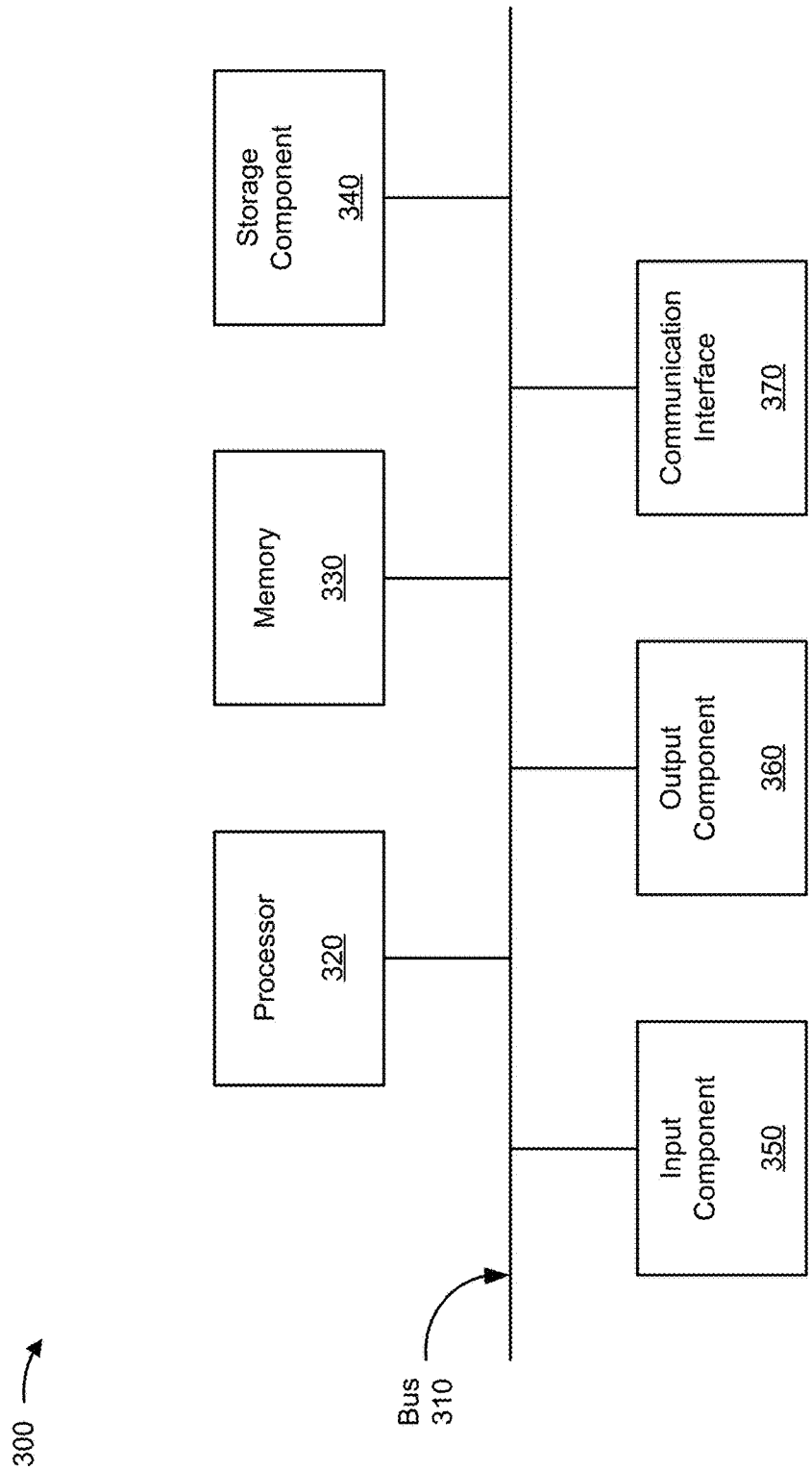
FIG. 3 is a diagram of example components of one or more devices of FIG. 2.

FIG. 3 is a diagram of example components of a device 300. Device 300 may correspond to PSM 210, power supply 220, power source 230, system load 240, and/or user device 260. In some implementations, PSM 210, power supply 220, power source 230, system load 240, and/or user device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 includes a component that provides output information from device 300 (e.g., a display, a speaker, one or more light-emitting diodes (LEDs), etc.).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing power based on one or more programmable restrictions associated with a power supply. In some implementations, one or more process blocks of FIG. 4 may be performed by PSM 210. In some implementations, one or more process blocks of FIG. 4 may be performed by another device or a group of devices separate from or including PSM 210, such as power supply 220, power source 230, system load 240, and/or user device 260.

As shown in FIG. 4, process 400 may include receiving information regarding one or more programmable restrictions associated with a power supply (block 410). For example, PSM 210 may receive information regarding one or more programmable restrictions associated with power supply 220. In some implementations, the one or more programmable restrictions may be associated with an electrical parameter (e.g., power, current, voltage, etc.) regarding PSM 210, power supply 220, power source 230, and/or system load 240. For example, the electrical parameter may include a current, a voltage, an amount of power, and/or the like, which PSM 210, power supply 220, and/or power source 230 may provide. Additionally or alternatively, the electrical parameter may include a current, a voltage, an amount of power, and/or the like, which PSM 210, power supply 220, and/or system load 240 may receive.

In some implementations, the one or more programmable restrictions (e.g., a threshold value, a maximum threshold value, a minimum threshold value, etc.) may be associated with PSM 210, power supply 220, power source 230, and/or system load 240. For example, the one or more programmable restrictions may include a maximum and/or a minimum threshold value of power, a current, a voltage, and/or the like, associated with PSM 210, power supply 220, power source 230, and/or system load 240.

In some implementations, power supply 220 may satisfy the one or more programmable restrictions without removing power for PSM 210, power supply 220, power source 230, and/or system load 240. For example, the one or more programmable restrictions may be associated with an amount of power, a current, and/or a voltage that power supply 220 may receive and/or may provide without removing power for PSM 210, power supply 220, power source 230, and/or system load 240.

In some implementations, the one or more programmable restrictions may be based on a protective device (e.g., an electrical switch, a relay, a circuit breaker, a fuse, etc.) associated with power source 230 and/or power supply 220. For example, the one or more programmable restrictions may be based on a value of an amount of power, a current, and/or a voltage, which if satisfied, may cause the one or more protective devices to remove power for PSM 210, power supply 220, power source 230, and/or system load 240.

In some implementations, the one or more programmable restrictions may be based on a rated value (e.g., a maximum rated value, a minimum rated value, etc.) of an amount of power, a current, and/or a voltage associated with PSM 210, power supply 220, and/or power source 230. For example, the one or more programmable restrictions may be based on a rated value of an amount of power, a current, and/or a voltage that PSM 210 and/or power supply 220 may receive. Additionally or alternatively, the one or more programmable restrictions may be based on a rated value of an amount of power, a current, and/or a voltage that PSM 210, power supply 220, and/or power source 230 may provide.

In some implementations, the one or more programmable restrictions may be based on an amount of power, a current, and/or a voltage that is less than a maximum rated value of an amount of power, a current, and/or a voltage associated with PSM 210, power supply 220, and/or power source 230. For example, the one or more programmable restrictions may be based on a current that is less than a maximum rated value of current associated with PSM 210, power supply 220, and/or power source 230.

By basing the one or more programmable restrictions on an amount of power, a current, and/or a voltage that is less than the maximum rated value of an amount of power, a current, and/or a voltage associated with PSM 210, power supply 220, and/or power source 230, PSM 210 may cause PSM 210, power supply 220, and/or power 230 to degrade more slowly than when the one or more programmable restrictions are based on the maximum rated value of an amount of power, a current, and/or a voltage associated with PSM 210, power supply 220, and/or power 230. In this way, PSM 210 may provide for increased reliability (e.g., life expectancy, service life, in-service life, etc.) associated with PSM 210, power supply 220, and/or power source 230.

In some implementations, the one or more programmable restrictions may be based on an amount of power, a current, and/or a voltage associated with PSM 210, power supply 220, and/or power source 230 that is greater than the rated maximum value of an amount of power, a current, and/or a voltage associated with PSM 210, power supply 220, and/or power source 230. For example, the one or more programmable restrictions may be based on a current that is greater than the maximum rated value of current associated with PSM 210, power supply 220, and/or power source 230.

By basing the one or more programmable restrictions on an amount of power, a current, and/or a voltage that is greater than the maximum rated value of an amount of power, a current, and/or a voltage associated with PSM 210, power supply 220, and/or power source 230, a user may be able to choose PSM 210, power supply 220, and/or power source 230 and avoid an expensive associated with another PSM 210, another power supply 220, and/or another power source 230.

In some implementations, the one or more programmable restrictions may include a maximum threshold value of current associated with power supply 220, a minimum threshold value of current associated with power supply 220, a maximum threshold value of voltage associated with power supply 220, a minimum threshold value of voltage associated with power supply 220, a maximum threshold value of power associated with power supply 220, and/or a minimum threshold value of power associated with power supply 220.

In some implementations, the maximum threshold value of current associated with power supply 220 may include a maximum threshold value of current that power supply 220 may receive and/or may provide. For example, the maximum threshold value of current that power supply 220 may receive and/or may provide may be based on a particular context in which power supply 220 operates (e.g., the maximum threshold value of current may be between approximately 40 Å and approximately 100 Å in one context, approximately equal to 60 Å in another context, approximately equal to 80 A in yet another context, etc.). In some implementations, the maximum threshold value of current that power supply 220 may receive may be the same or different than the maximum threshold value of current that power supply 220 may provide.

In some implementations, the maximum threshold value of current associated with power supply 220 may be based on PSM 210, power supply 220, power source 230, and/or system load 240. For example, the maximum threshold value of current may be based on a value of current, which if satisfied, may cause damage to one or more electrical components (e.g., electrical contacts, wiring, fuses, etc.) and/or a malfunction associated with PSM 210, power supply 220, power source 230, and/or system load 240.

In some implementations, power supply 220 may receive a current from power source 230 that is higher than the maximum threshold value of current associated with power supply 220, which may cause power to be removed for a connection between power supply 220 and power source 230. Power may also be removed for system load 240 based on removing power for the connection. For example, power may be removed for the connection based on a protective device (e.g., an electrical switch, a relay, a circuit breaker, a fuse, etc.) associated with power supply 220 and/or power source 230 removing power for the connection.

By providing a maximum threshold value of current associated with power supply 220, PSM 210 may prevent PSM 210, power supply 220, power source 230, and/or system load 240 from being removed from power, being damaged, and/or malfunctioning based on too much current.

In some implementations, the maximum threshold value of voltage associated with power supply 220 may include a maximum threshold value of voltage that power supply 220 may receive and/or may provide. For example, the maximum threshold value of voltage that power supply 220 may receive and/or may provide may be based on a particular context in which power supply 220 operates (e.g., the maximum threshold value of voltage may be between approximately 40V and approximately 72V in one context, etc.).

In some implementations, the maximum threshold value of voltage associated with power supply 220 may be based on PSM 210, power supply 220, power source 230, and/or system load 240. For example, the maximum threshold value of voltage may be based on a value of voltage, which if satisfied, may cause damage to one or more electrical components (e.g., electrical contacts, wiring, fuses, etc.) and/or a malfunction associated with PSM 210, power supply 220, power source 230, and/or system load 240.

By providing a maximum and/or a minimum threshold value of voltage associated with power supply 220, PSM 210 may prevent PSM 210, power supply 220, power source 230, and/or system load 240 from being removed from power, being damaged, and/or malfunctioning based on too much or too little voltage.

In some implementations, the maximum threshold value of power associated with power supply 220 may include a maximum threshold value of power that power supply 220 may receive and/or may provide. As one specific example, the maximum threshold value of power that power supply 220 may receive may be between approximately 2400 W and approximately 4320 W. As another specific example, the maximum threshold value of power that power supply 220 may receive may be approximately 3120 W.

In some implementations, the maximum threshold value of power that power supply 220 may receive and/or may provide may be based on a maximum current and a maximum voltage that power supply 220 may receive and/or may provide. For example, if the maximum current that power supply 220 may receive is 60 A and the maximum voltage that power supply 220 may receive is 72V, the maximum threshold value of power that power supply 220 may receive may be approximately 4320 W (i.e., 60 A×72V=4320 W).

In some implementations, the maximum threshold value of power that power supply 220 may provide may be based on the maximum threshold value of power that power supply 220 may receive. For example, the maximum threshold value of power that power supply 220 may provide may equal the maximum threshold value of power that power supply 220 may receive multiplied by an efficiency factor (e.g., 0.8, 0.9, 0.95, etc.) associated with power supply 220. As one specific example, the maximum threshold value of power that power supply 220 may provide may be between approximately 2200 W and approximately 3890 W (i.e., 0.9×4320 W=3890 W, in one example above). As another specific example, the maximum threshold value of power that power supply 220 may provide may be approximately 2808 W (i.e., 0.9×3120 W, in one example above).

In some implementations, the minimum threshold value of power associated power supply 220 may include a minimum threshold value of power that power supply 220 may receive and/or may provide. In some implementations, the minimum threshold value of power that power supply 220 may receive and/or may provide may be based on a maximum current and a minimum voltage that power supply 220 may receive and/or may provide. For example, if the maximum current that power supply 220 may receive is 60 A and the minimum voltage that power supply 220 may receive is 40V, the minimum threshold value of power that power supply 220 may receive may be approximately 2400 W.

In some implementations, the minimum threshold value of power that power supply 220 may provide may be based on the minimum threshold value of power that power supply 220 may receive. For example, the minimum threshold value of power that power supply 220 may provide may equal the minimum threshold value of power that power supply 220 may receive multiplied by an efficiency factor (e.g., 0.8, 0.9, 0.95, etc.) associated with power supply 220. In the example provided above, the minimum threshold value of power that power supply 220 may provide may be approximately 2160 W (i.e., 0.9×2400 W=2160 W).

In some implementations, the maximum and/or the minimum threshold value of power associated with power supply 220 may be based on PSM 210, power supply 220, power source 230, and/or system load 240. For example, the maximum and/or the minimum threshold value of power that power supply 220 may receive may be based on a value of an amount of power, which if satisfied, may cause damage to one or more electrical components (e.g., electrical contacts, wiring, fuses, etc.) and/or a malfunction associated with PSM 210, power supply 220, power source 230, and/or system load 240.

By providing a maximum and/or a minimum threshold value of power associated with power supply 220, PSM 210 may prevent PSM 210, power supply 220, power source 230, and/or system load 240 from being removed from power, being damaged, and/or malfunctioning based on too much or too little power.

In some implementations, PSM 210 may receive information regarding the one or more programmable restrictions. For example, PSM 210 may receive the information regarding the one or more programmable restrictions from user device 260 via network 250. In some implementations, PSM 210 may receive one or more commands. For example, PSM 210 may receive a command from user device 260 based on the one or more programmable restrictions via network 250. In some implementations, PSM 210 may provide information. For example, PSM 210 may provide information to user device 260 via network 250 based on the one or more commands received from user device 260. In some implementations, information that PSM 210 may provide may include a report, real-time information, an alert, a notification, diagnostic information, and/or the like.

In some implementations, the report may include information associated with the one or more programmable restrictions, PSM 210, power supply 220, power source 230, and/or system load 240. For example, the report may include information associated with a time when the one or more programmable restrictions are met, a malfunction of power source 230, an amount of power that power supply 220 provided and/or received over a period of time, and/or the like.

In some implementations, the real-time information may include information associated with a real-time measurement associated with PSM 210, power supply 220, power source 230, and/or system load 240. For example, the real-time information may be associated with a real-time amount of power associated with power supply 220, a real-time current associated with power supply 220, a real-time voltage associated with power supply 220, a real-time amount of power provided at the output of power supply 220, a real-time amount of power received at the input of power supply, a real-time voltage measured at an internal location of power supply 220, and/or the like.

In some implementations, the alert may include information associated with PSM 210, power supply 220, power source 230, and/or system load 240 being removed from power, being damaged, and/or malfunctioning. For example, the alert may include information associated with a time of a failure of power source 230, a time of a failure of power supply 220, a time of a failure of system load 240, a time of a disconnection associated with power source 230, a time of a disconnection associated with at least a portion of system load 240, and/or the like.

In some implementations, the notification may include information associated with an action to be taken with regard to PSM 210, power supply 220, power source 230, and/or system load 240. For example, the notification may include information associated with connecting another power source 230 and/or another system load 240 to power supply 220, disconnecting power source 230 and/or system load 240 from power supply 220, and/or the like. In some implementations, PSM 210 may determine an action to be taken based on information associated with PSM 210, power supply 220, power source 230, and/or system load 240.

In some implementations, the diagnostic information may include information associated with performing service on components of PSM 210, power source 230, power supply 220, and/or system load 240. For example, the diagnostic information may include information associated with a number of hours that PSM 210 has been in power, a number of hours that power supply 220 has been in power, a number of hours until a next-scheduled service of PSM 210 and/or power supply 220, whether power source 230 has been functioning properly, whether system load 240 has been functioning properly, and/or the like.

By receiving information and/or providing information, PSM 210 may prevent PSM 210, power supply 220, power source 230, and/or system load 240 from being removed from power, being damaged, and/or malfunctioning and may increase an amount of time that power source 230, power supply 220, PSM 210, and/or system load 240 are in power and functioning properly.

In this way, PSM 210 may receive information regarding one or more programmable restrictions associated with a power supply.

As further shown in FIG. 4, process 400 may include receiving a measurement of voltage associated with the power supply (block 420). For example, PSM 210 may receive the measurement of voltage associated with power supply 220.

In some implementations, the measurement of voltage may include a voltage associated with power supply 220. In some implementations, a voltage associated with power supply 220 may include a voltage that power supply 220 may receive (e.g., at the input of power supply 220) and/or may provide (e.g., at the output of power supply 220), a voltage that power supply 220 may be receiving and/or may be providing, and/or a previous voltage that power supply 220 may have received and/or may have provided.

In some implementations, the measurement of voltage may be a real-time measurement, an average measurement, a sampling over a time period, and/or the like. For example, PSM 210 may receive the measurement of voltage based on a real-time measurement of voltage that power supply 220 receives.

By receiving the measurement of voltage based on a real-time measurement of voltage, PSM 210 may provide more accurate and up-to-date information to another device (e.g., user device 260) as compared to the measurement of voltage based on an average measurement, so that actions may be taken based on the measurement of voltage.

In some implementations, PSM 210 may receive the measurement of voltage from power source 230, power supply 220, system load 240, and/or an external device (e.g., a voltage measurement device that is separate from power supply 220). In some implementations, PSM 210 may receive the measurement of voltage at the input or the output of power supply 220. For example, PSM 210 may receive the measurement of voltage based on a potential transformer at the input of power supply 220.

By receiving the measurement of voltage at the input of power supply 220, PSM 210 may receive a measurement of voltage that may be more accurate with regard to the voltage that power supply 220 receives from power source 230 than a measurement of the voltage at the output of power supply 220.

In this way, PSM 210 may receive a measurement of voltage associated with the power supply.

As further shown in FIG. 4, process 400 may include determining a current associated with the power supply based on the one or more programmable restrictions, the measurement of voltage, and a first amount of power associated with the power supply (block 430). For example, PSM 210 may determine the current associated with power supply 220 based on the one or more programmable restrictions, the measurement of voltage, and the first amount of power associated with power supply 220.

In some implementations, the current associated with power supply 220 may include a current that power supply 220 may receive (e.g., at the input of power supply 220) and/or may provide (e.g., at the output of power supply 220), a current that power supply 220 may be receiving and/or may be providing, and/or a previous current that power supply 220 may have received and/or may have provided.

In some implementations, the first amount of power may include an amount of power that power supply 220 may receive (e.g., at the input of power supply 220) and/or may provide (e.g., at the output of power supply 220), an amount of power that power supply 220 may be receiving and/or may be providing, and/or a previous amount of power that power supply 220 may have received and/or may have provided.

TABLE 1

| Voltage that power supply 220 may receive (V) | Amount of power that power supply 220 may receive (W) | Current that power supply 220 may receive (A) |
| --- | --- | --- |
| 40 | 2400 | 60 |
| 42 | 2520 | 60 |
| 44 | 2640 | 60 |
| 46 | 2760 | 60 |
| 48 | 2880 | 60 |
| 50 | 3000 | 60 |
| 52 | 3120 | 60 |
| 54 | 3120 | 57.8 |
| 56 | 3120 | 55.7 |
| 58 | 3120 | 53.8 |
| 60 | 3120 | 52.0 |
| 62 | 3120 | 50.3 |
| 64 | 3120 | 48.8 |
| 66 | 3120 | 47.3 |
| 68 | 3120 | 45.9 |
| 70 | 3120 | 44.6 |
| 72 | 3120 | 43.3 |

Table 1 shows examples of corresponding voltages that power supply 220 may receive, amounts of power that power supply 220 may receive, and currents that power supply 220 may receive. In some contexts in which power supply 220 is used, the values in Table 1 might be different.

In some implementations, PSM 210 may determine that the current is equal to an amount of power associated with power supply 220 divided by the measurement of voltage if the first amount of power divided by the measurement of voltage does not satisfy the one or more programmable restrictions. For example, PSM 210 may determine that the current is equal to the first amount of power divided by the measurement of voltage if the first amount of power divided by the measurement of voltage does not satisfy the maximum threshold value of current associated with power supply 220.

In some implementations, PSM 210 may determine the current associated with power supply 220 based on the one or more programmable restrictions and an amount of power associated with power supply 220. For example, PSM 210 may determine that the current is equal to the maximum threshold value of current associated with power supply 220 if the amount of power associated with power supply 220 is equal to the minimum threshold value of power associated with power supply 220.

In some implementations, PSM 210 may determine the current based on the one or more programmable restrictions, the measurement of voltage, and an amount of power that power supply 220 may receive and/or may provide, and a previous amount of power that power supply 220 may have received and/or may have provided. For example, PSM 210 may determine that the current is equal to the amount of power that power supply 220 may receive and/or may provide divided by the measurement of voltage. PSM 210 may make the determination if the amount of power that power supply 220 may receive and/or may provide divided by the measurement of voltage does not satisfy the maximum threshold value of current associated with power supply 220 and the amount of power that power supply 220 may receive and/or may provide is less than the previous amount of power that power supply 220 may have received and/or may have provided.

In some implementations, PSM 210 may determine the current based on the one or more programmable restrictions, the measurement of voltage, a previous measurement of voltage, and a previous current that power supply 220 may have received and/or may have provided. For example, PSM 210 may determine that the current is equal to the maximum threshold value of current associated with power supply 220. PSM 210 may make the determination if the previous current that power supply 220 may have received and/or may have provided is equal to the maximum threshold value of current and the measurement of voltage is less than a previous measurement of voltage.

In some implementations, PSM 210 may determine the current based on the one or more programmable restrictions, the measurement of voltage, an amount of power that power supply 220 may receive and/or may provide, and a previous amount of power that power supply 220 may have received and/or may have provided. For example, PSM 210 may determine that the current is equal to the amount of power that power supply 220 may receive and/or may provide divided by the measurement of voltage. PSM 210 may make the determination if the previous amount of power that power supply 220 may have received and/or may have provided is equal to the maximum threshold value of power associated with power supply 220.

In some implementations, PSM 210 may determine the current so that the current may not satisfy the one or more programmable restrictions. For example, PSM 210 may determine that the current may not satisfy the maximum threshold value of current associated with power supply 220.

In some implementations, PSM 210 may determine the current based on receiving a measurement of current at the input and/or the output of power supply 220. For example, PSM 210 may receive the measurement of current from power source 230, power supply 220, system load 240, and/or an external device.

In some implementations, PSM 210 may adjust power supply 220 based on determining the current without removing power for a connection between power supply 220 and power source 230 associated with power supply 220. For example, PSM 210 may adjust an amount of power, a current, and/or a voltage associated with power supply 220 based on determining the current. PSM 210 may adjust the amount of power, the current, and/or the voltage so that the current associated with power supply 220 does not cause a protective device (e.g., an electrical switch, a relay, a circuit breaker, a fuse, etc.) associated with power supply 220 and/or power source 230 to remove power for the connection.

In some implementations, PSM 210 may adjust power supply 220 based on the one or more programmable restrictions without removing power for a connection between power supply 220 and power source 230. For example, PSM 210 may adjust the amount of power associated with supply 220 so that the amount of power associated with power supply 220 is equal to the maximum threshold value of power associated with power supply 220, and/or the minimum threshold value of power associated with power supply 220. PSM 210 may adjust the amount of power associated with power supply 220 so that the amount of power associated with power supply 220 does not cause a protective device (e.g., an electrical switch, a relay, a circuit breaker, a fuse, etc.) associated with power supply 220 and/or power source 230 to remove power for the connection.

In some implementations, PSM 210 may adjust the current associated with power supply 220 to be equal to the maximum threshold value of current associated with power supply 220. PSM 210 may adjust the current associated with power supply 220 so that the current associated with power supply 220 does not cause a protective device (e.g., an electrical switch, a relay, a circuit breaker, a fuse, etc.) associated with power supply 220 and/or power source 230 to remove power for the connection.

In this way, PSM 210 may determine a current associated with the power supply based on the one or more programmable restrictions, the measurement of voltage, and a first amount of power associated with the power supply.

As further shown in FIG. 4, process 400 may include causing a load associated with the power supply to be adjusted based on determining the current without removing power for a connection between the power supply and a power source associated with the power supply (block 440). For example, PSM 210 may cause system load 240 to be adjusted based on determining the current without removing power for the connection between power supply 220 and power source 230.

In some implementations, PSM 210 may cause system load 240 to adjust an amount of power associated with system load 240. For example, PSM 210 may communicate with system load 240 to cause power to be removed for at least a portion of system load 240 or to cause at least a portion of system load 240 to receive power (e.g., connected, engaged, activated, powered on, power being received by, power being provided to, etc.). In some implementations, PSM 210 may communicate with system load 240 to cause power to be removed for at least a first portion of system load 240, while causing power to be provided to at least a second portion of system load 240.

In some implementations, the amount of power associated with system load 240 may include an amount of power that power supply 220 may provide to system load 240, an amount of power that power supply 220 may be providing to system load 240, a previous amount of power that power supply 220 may have provided to system load 240, an amount of power that system load 240 may consume, an amount of power that system load 240 may be consuming, a previous amount of power that system load 240 consumed, and/or the like.

In some implementations, PSM 210 may provide one or more signals to system load 240 to cause system load 240 to adjust the amount of power associated with system load 240. For example, system load 240 may increase or decrease the amount of power associated with system load 240 based on the one or more signals.

In some implementations, the one or more signals may include information associated with the one or more programmable restrictions. For example, the one or more signals may include information associated with the maximum threshold value of current associated with power supply 220, the maximum threshold value of power associated with power supply 220, and/or the minimum threshold value of power associated with power supply 220. In some implementations, the one or more signals may include an indication that an amount of power associated with power supply 220 and/or an amount of power associated with power supply 220 is equal to a threshold value associated with the maximum threshold value of current associated with power supply 220, the maximum threshold value of power associated with power supply 220, and/or the minimum threshold value of power associated with power supply 220.

In some implementations, the one or more signals may include information associated with increasing and/or decreasing the amount of power associated with system load 240. For example, the one or more signals may include a request for system load 240 to increase or decrease the amount of power associated with system load 240 by a specified amount. In some implementations, PSM 210 may determine the specified amount as an amount of power by which system load 240 may increase or decrease the amount of power associated with system load 240. For example, PSM 210 may determine the specified amount by subtracting an amount of power associated with the one or more programmable restrictions from a previous amount of power that power supply 220 may have received and/or may have provided to system load 240. In some implementations, PSM 210 may determine the specified amount by subtracting an amount of power equal to the measurement of voltage multiplied by the maximum threshold value of current associated with power supply 220 from the previous amount of power that power supply 220 may have received and/or may have provided to system load 240.

By providing the one or more signals to system load 240, PSM 210 may cause system load 240 to decrease an amount of power associated with system load 240 and may prevent power from being removed for at least a portion of system load 240 in a way that may cause damage to system load 240, may cause system load 240 to malfunction, and/or may cause power to be removed for more of system load 240 than necessary.

In some implementations, the one or more signals may include a first signal and a second signal based on the first signal. For example, the first signal may include information associated with the one or more programmable restrictions and the second signal may include information associated with an amount of power by which system load 240 may increase or decrease the amount of power associated with system load 240. In some implementations, the first signal may be provided before the second signal.

In some implementations, PSM 210 may cause power to be removed for some or all of system load 240 based on determining the current. For example, PSM 210 may determine the current associated with power supply 220 and PSM 210 may determine an amount of power associated with power supply 220 based on the current. PSM 210 may determine that the amount of power may be approaching the maximum threshold value of power. PSM 210 may provide a signal to system load 240 to cause system load 240 to decrease the amount of power associated with system load 240. In some implementations, system load 240 may decrease the power associated with system load 240 by removing power for some or all of system load 240. For example, system load 240 may remove power for one or more components (e.g., a network device, a server, a line card, etc.) of system load 240 based on the signal from PSM 210.

By causing power to be removed for some of system load 240, PSM 210 may prevent PSM 210, power supply 220, power source 230, and/or system load 240 from being removed from power, being damaged, and/or malfunctioning. In this way, PSM 210 may also prevent all of system load 240 from being removed from power based on power source 230 removing power for power supply 220.

In some implementations, PSM 210 may cause power supply 220 to remove power for at least a portion of system load 240 based on determining the current. For example, PSM 210 may cause one or more electrical switches of power supply 220 to remove power for at least a portion of system load 240 based on determining the current. In some implementations, PSM 210 may cause power supply 220 to return power for at least the portion of system load 240 that power was removed for. For example, PSM 210 may cause the one or more electrical switches of power supply 220 to return power for at least the portion of system load 240 from which power was removed. Power may be returned for at least the portion of system load 240 when power supply 220 may provide power to at least the portion of system load 240.

By removing power for at least a portion of system load 240, PSM 210 may prevent PSM 210, power supply 220, power source 230, and/or system load 240 from being removed from power, being damaged, and/or malfunctioning. Further, by reconnecting at least the portion of system load 240, PSM 210 may return power to at least the portion of system load 240 that power was removed for without a need for manual intervention.

In some implementations, PSM 210 may cause another PSM 210, another power supply 220, and/or another power source 230 to provide an amount of power to at least a portion of system load 240 from which power was removed. For example, PSM 210 may cause at least the portion of system load 240 from which power was removed to connect to another PSM 210, another power supply 220, and/or another power source 230.

In this way, PSM 210 may allow at least a portion of system load 240 from which power was removed to receive power based on another PSM 210, another power supply 220, and/or another power source 230 when an amount of power provided by PSM 210, power supply 220, and/or power source 230 is limited.

In some implementations, PSM 210 may cause system load 240 to adjust an amount of power (e.g., increase, decrease, etc.) associated with system load 240 based on one or more factors. For example, PSM 210 may cause system load 240 to adjust the amount of power associated with system load 240 based on one or more factors associated with one or more components (e.g., a network device, a server, a line card, etc.) of system load 240.

In some implementations, the one or more factors may be based on priority associated with the one or more components of system load 240. For example, the one or more factors may include the one or more components that serve critical loads, the one or more components that serve customers that subscribe to a high priority service, and/or the like. In some implementations, PSM 210 may cause system load 240 to decrease an amount of power associated with system load 240 based on the priority associated with the one or more components. For example, PSM 210 may cause system load 240 to remove power for the one or more components that are not associated with critical loads, customers that subscribe to a high priority service, and/or the like.

By using the priority associated with the one or more components of system load 240 to adjust an amount of power associated with system load 240, PSM 210 may cause system load 240 to decrease an amount of power associated with system load 240. PSM 210 may also ensure that the one or more components of system load 240 associated with critical loads, customers that subscribe to a high priority service, and/or the like, are not removed from power. In this way, PSM 210 may also prevent PSM 210, power supply 220, power source 230, and/or system load 240 from being removed from power, being damaged, and/or malfunctioning based on system load 240 decreasing an amount of power associated with system load 240.

Additionally or alternatively, the one or more factors may be based on an amount of power associated with the one or more components (e.g., an amount of power that the one or more components may consume, an amount of power that the one or more components may be consuming, an amount of power that the one or more components may have consumed, etc.). For example, the one or more factors may include one or more components that are associated with a larger or a smaller amount of power than other components. In some implementations, PSM 210 may cause system load 240 to decrease an amount of power associated with system load 240 based on the amount of power associated with the one or more components. For example, PSM 210 may cause system load 240 to remove power for the one or more components that are associated with a larger or a smaller amount of power than other components.

By using an amount of power associated with the one or more components of system load 240 to adjust an amount of power associated with system load 240, PSM 210 may cause system load 240 to decrease an amount of power associated with system load 240. PSM 210 may also cause system load 240 to remove power for the one or more components that are associated with a larger or a smaller amount of power than other components and not to remove power for the other components. In this way, PSM 210 may also prevent PSM 210, power supply 220, power source 230, and/or system load 240 from being removed from power, being damaged, and/or malfunctioning based on system load 240 decreasing an amount of power associated with system load 240.

Additionally or alternatively, the one or more factors may be based on a resistance to malfunction, resistance to damage, and/or the like, associated with the one or more components of system load 240. For example, the one or more factors may include one or more components that may experience damage, may malfunction, and/or the like, if the one or more components are removed from power. In some implementations, PSM 210 may cause system load 240 to decrease an amount of power associated with system load 240 based on a resistance to malfunction, resistance to damage, and/or the like, associated with the one or more components. For example, PSM 210 may also cause system load 240 to remove power for one or more components that may not experience damage, may not malfunction, and/or the like, if the one or more components are removed from power.

By using the resistance to malfunction, resistance to damage, and/or the like, associated with the one or more components of system load 240 to adjust an amount of power associated with system load 240, PSM 210 may cause system load 240 to decrease an amount of power associated with system load 240. PSM 210 may also prevent damage, a malfunction, and/or the like, associated with one or more components of system load 240. In this way, PSM 210 may also prevent PSM 210, power supply 220, power source 230, and/or system load 240 from being removed from power, being damaged, and/or malfunctioning based on system load 240 decreasing an amount of power associated with system load 240.

Additionally or alternatively, the one or more factors may be based on a user condition (e.g., a plan, a schedule, etc.) associated with the one or more components of system load 240. For example, the one or more factors may include a plan, a schedule, and/or the like, for removing power for the one or more components. In some implementations, PSM 210 may cause system load 240 to decrease an amount of power associated with system load 240 based on the user condition. For example, PSM 210 may cause system load 240 to remove power for one or more components based on the plan, the schedule, and/or the like.

By using the user condition associated with the one or more components of system load 240 to adjust an amount of power associated with system load 240, PSM 210 may cause system load 240 to decrease an amount of power associated with system load 240. PSM 210 may also prevent one or more components of system load 240 from being removed from power based on the user condition. In this way, PSM 210 may also prevent PSM 210, power supply 220, power source 230, and/or system load 240 from being removed from power, being damaged, and/or malfunctioning based on system load 240 decreasing an amount of power associated with system load 240.

Additionally or alternatively, the one or more factors may be based on usage associated with the one or more components of system load 240. For example, the one or more factors may include hours of operation of the one or more components. In some implementations, PSM 210 may cause system load 240 to decrease an amount of power associated with system load 240 based on usage associated with the one or more components. For example, PSM 210 may cause system load 240 to remove power for the one or more components that are associated with hours of operation that do not satisfy a threshold value.

By using the usage associated with the one or more components of system load 240 to adjust an amount of power associated with system load 240, PSM 210 may cause system load 240 to decrease an amount of power associated with system load 240. PSM 210 may also prevent power being removed for the one or more components of system load 240 that are used most often. In this way, PSM 210 may also prevent PSM 210, power supply 220, power source 230, and/or system load 240 from being removed from power, being damaged, and/or malfunctioning based on system load 240 decreasing an amount of power associated with system load 240.

Additionally or alternatively, the one or more factors may be based on redundancy associated with the one or more components of system load 240. For example, the one or more factors may include one or components that are associated with a connection to another device (e.g., another power supply 220, another power source 230, a battery, etc.). In some implementations, PSM 210 may cause system load 240 to decrease an amount of power associated with system load 240 based on the redundancy associated with the one or more components. For example, PSM 210 may cause system load 240 to remove power for the one or more components that are associated with redundancy.

By using the redundancy associated with the one or more components of system load 240 to adjust an amount of power associated with system load 240, PSM 210 may cause system load 240 to decrease an amount of power associated with system load 240. PSM 210 may also prevent power being removed for the one or more components that are not associated with redundancy. In this way, PSM 210 may also prevent PSM 210, power supply 220, power source 230, and/or system load 240 from being removed from power, being damaged, and/or malfunctioning based on system load 240 decreasing an amount of power associated with system load 240.

In some implementations, system load 240 may adjust the amount of power associated with system load 240 based on the one or more factors discussed above.

In some implementations, PSM 210 may cause power to be removed for at least a portion of system load 240 based on the maximum threshold value of current associated with power supply 220. For example, PSM 210 may cause power to be removed for at least a portion of system load 240 when the current associated with power supply 220 approaches or satisfies the maximum threshold value of current associated with power supply 220.

In some implementations, PSM 210 may cause power to be removed for at least a portion of system load 240 based on the maximum and/or minimum threshold value of power associated with power supply 220. For example, PSM 210 may cause power to be removed for at least a portion of system load 240 when an amount of power associated with power supply 220 approaches or satisfies the maximum and/or the minimum threshold value of power associated with power supply 220.

In some implementations, PSM 210 may prevent power supply 220 from not satisfying the one or more programmable restrictions associated with power supply 220 so that power is not removed for a connection between power supply 220 and power source 230. For example, PSM 210 may prevent power supply 220 from providing a current that satisfies the maximum threshold value of current associated with power supply 220 and/or an amount of power that satisfies the maximum and/or the minimum threshold value of power associated with power supply 220.

In some implementations, PSM 210 may prevent power supply 220 from providing an amount of power and/or a current that satisfies the one or more programmable restrictions based on an increase in the amount of power associated system load 240 without removing power for a connection between power supply 220 and power source 230. For example, PSM 210 may provide the maximum threshold value of current to system load 240 without removing power for the connection between power supply 220 and power source 230. PSM 210 may provide the maximum threshold value of current when system load 240 attempts to increase the amount of power associated with system load 240 above an amount of power associated with the maximum threshold value of current.

By preventing power supply 220 from providing an amount of power and/or a current that satisfies the one or more programmable restrictions without removing power for a connection between power supply 220 and power source 230, PSM 210 may prevent power being removed for system load 240 based on an attempt to increase the amount of power associated with system load 240. In this way, PSM 210 may also prevent PSM 210, power supply 220, power source 230, and/or system load 240 from being removed from power, being damaged, and/or malfunctioning.

In some implementations, PSM 210 may prevent power supply 220 from providing an amount power without removing power for a connection between power supply 220 and power source 230, where the amount of power is greater than a maximum threshold value of power associated with power supply 220 or is less than a minimum threshold value of power associated with the power supply 220.

As further shown in FIG. 4, process 400 may include causing the power supply to provide a second amount of power based on causing the load associated with the power supply to be adjusted (block 450). For example, PSM 210 may cause power supply 220 to provide a second amount of power based on causing system load 240 associated with power supply 220 to be adjusted.

In some implementations, the second amount of power may include an amount of power that power supply 220 may receive (e.g., at the input of power supply 220) and/or may provide (e.g., at the output of power supply 220), an amount of power that power supply 220 may be receiving and/or may be providing, and/or a previous amount of power that power supply 220 may have received and/or may have provided.

In some implementations, the second amount of power may the same as the first amount of power. For example, the second amount of power may equal the first amount of power. In some implementations, the second amount of power may be different from the first amount of power. For example, the second amount of power may be more or less than the first amount of power. In some implementations, the second amount of power may equal the maximum and/or the minimum threshold value of power associated with power supply 220. In some implementations, the second amount of power may equal an amount of power associated with power supply 220 when the current associated with power supply 220 satisfies the maximum threshold value of current.

In some implementations, PSM 210 may cause an amount of power to be provided to system load 240. For example, PSM 210 may cause power supply 220 to provide an amount of power to system load 240 based on the amount of power associated with system load 240 after power is removed for at least a portion of system load 240.

In some implementations, PSM 210 may cause power supply 220 to provide an amount of power based on the one or more programmable restrictions. For example, power supply 220 may provide an amount of power that may equal the maximum and/or the minimum threshold value of power associated with power supply 220. In some implementations, power supply 220 may provide an amount of power equal to the amount of power associated with power supply 220 when the current associated with power supply 220 satisfies the maximum threshold value of current.

In some implementations, PSM 210 may cause power supply 220 to provide an amount of power based on causing system load 240 to be adjusted. For example, PSM 210 may cause power supply 220 to provide an amount of power to system load 240 based on system load 240 decreasing an amount of power associated with system load 240.

In this way, PSM 210 may cause the power supply to provide a second amount of power based on causing the load associated with the power supply to be adjusted.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, PSM 210 may allow at least a portion of system load 240 to remain in power when at least a portion of power source 230 experiences a malfunction. PSM 210 may also prevent PSM 210, power supply 220, power source 230, and/or system load 240 from being removed from power, being damaged, and/or malfunctioning based on an amount of power, current, and/or voltage associated with power supply 220. PSM 210 may also prevent power being removed for all of system load 240 based on an amount of power, current, and/or voltage associated with power supply 220. Further, PSM 210 may allow a user to avoid incurring an expenditure associated with a more expensive power source 230 that may provide power to power supply 220 based on a maximum amount of power consumed by system load 240 as compared to a less expensive power source 230 that may provide power to power supply 220 based on an amount of power that is less than the maximum amount of power that system load 240 consumes.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
   a memory; and
   a power supply module (PSM) to:
   receive information regarding one or more programmable restrictions associated with a threshold associated with a power supply,
   the threshold associated with the power supply being based on one or more of:
   the PSM,
   the power supply,
   a power source, or
   a load;
   receive a measurement of voltage associated with the power supply;
   determine a current associated with the power supply based on:
   the one or more programmable restrictions,
   the measurement of voltage, and
   a first amount of power associated with the power supply; and
   cause the power supply to provide a second amount of power to prevent one or more of the PSM, the power supply, the power source, or the load from being damaged or malfunctioning based on determining the current without removing power for a connection between the power supply and the power source associated with the power supply.

2. The device of claim 1, where the PSM is further to:
   adjust the power supply while not causing a protective device associated with the power supply to remove power for the connection.

3. The device of claim 1, where the PSM is further to:
   cause power to be removed from at least a first portion of the load based on determining the current while causing power to be provided to a second portion of the load.

4. The device of claim 1, where the PSM is further to:
   cause the load associated with the power supply to be adjusted based on determining the current.

5. The device of claim 1, where the PSM is further to:
   provide one or more signals to the load,
   the one or more signals including one or more of:
   information associated with a maximum threshold value of current associated with the power supply,
   information associated with a maximum threshold value of power associated with the power supply, or
   information associated with a minimum threshold value of power associated with the power supply.

6. The device of claim 1, where the PSM is further to:
   cause one or more electrical switches of the power supply to remove power for at least a portion of the load based on determining the current.

7. The device of claim 1, where the first amount of power associated with the power supply includes a prior quantity of power that the power supply received or provided.

8. A method, comprising:
   receiving, by a power supply module (PSM) associated with a power supply, information regarding one or more programmable restrictions associated with a threshold associated with a power supply,
   the threshold associated with the power supply being based on one or more of:
   the PSM,
   the power supply,
   a power source, or
   a load;
   receiving, by the PSM, a measurement of voltage associated with the power supply;
   determining, by the PSM, a current associated with the power supply based on:
   the one or more programmable restrictions,
   the measurement of voltage, and
   a first amount of power associated with the power supply; and
   causing, by the PSM, the power supply to provide a second amount of power to prevent one or more of the PSM, the power supply, the power source, or the load from being damaged or malfunctioning based on determining the current without removing power for a connection between the power supply and the power source associated with the power supply.

9. The method of claim 8, further comprising:
adjusting the power supply while not causing a protective device associated with the power supply to remove power for the connection.

10. The method of claim 8, further comprising:
causing power to be removed from at least a first portion of the load based on determining the current while causing power to be provided to a second portion of the load.

11. The method of claim 8, further comprising:
causing the load associated with the power supply to be adjusted based on determining the current.

12. The method of claim 8, further comprising:
providing one or more signals to the load,
the one or more signals including one or more of:
information associated with a maximum threshold value of current associated with the power supply,
information associated with a maximum threshold value of power associated with the power supply, or
information associated with a minimum threshold value of power associated with the power supply.

13. The method of claim 8, further comprising:
causing one or more electrical switches of the power supply to remove power for at least a portion of the load based on determining the current.

14. The method of claim 8, where the first amount of power associated with the power supply includes a prior quantity of power that the power supply received or provided.

15. A non-transitory computer readable medium storing instructions, the instructions comprising:
one or more instructions, that when executed by one or more processors in a power supply module (PSM), cause the one or more processors to:
receive information regarding one or more programmable restrictions associated with a threshold associated with a power supply,
the threshold associated with the power supply being based on one or more of:
the PSM,
the power supply,
a power source, or
a load;
receive a measurement of voltage associated with the power supply;
determine a current associated with the power supply based on:
the one or more programmable restrictions,
the measurement of voltage, and
a first amount of power associated with the power supply; and
cause the power supply to provide a second amount of power to prevent one or more of the PSM, the power supply, the power source, or the load from being damaged or malfunctioning based on determining the current without removing power for a connection between the power supply and the power source associated with the power supply.

16. The non-transitory computer readable medium of claim 15, where the one or more instructions further cause the one or more processors to:
adjust the power supply while not causing a protective device associated with the power supply to remove power for the connection.

17. The non-transitory computer readable medium of claim 15, where the one or more instructions further cause the one or more processors to:
cause power to be removed from at least a first portion of the load based on determining the current while causing power to be provided to a second portion of the load.

18. The non-transitory computer readable medium of claim 15, where the one or more instructions further cause the one or more processors to:
cause the load associated with the power supply to be adjusted based on determining the current.

19. The non-transitory computer readable medium of claim 15, where the one or more instructions further cause the one or more processors to:
provide one or more signals to the load,
the one or more signals including one or more of:
information associated with a maximum threshold value of current associated with the power supply,
information associated with a maximum threshold value of power associated with the power supply, or
information associated with a minimum threshold value of power associated with the power supply.

20. The non-transitory computer readable medium of claim 15, where the one or more instructions further cause the one or more processors to:
cause one or more electrical switches of the power supply to remove power for at least a portion of the load based on determining the current.

* * * * *